Jan. 9, 1951        E. F. HANSEN        2,537,753
MAGNETIC TORQUE METER
Filed Sept. 28, 1949
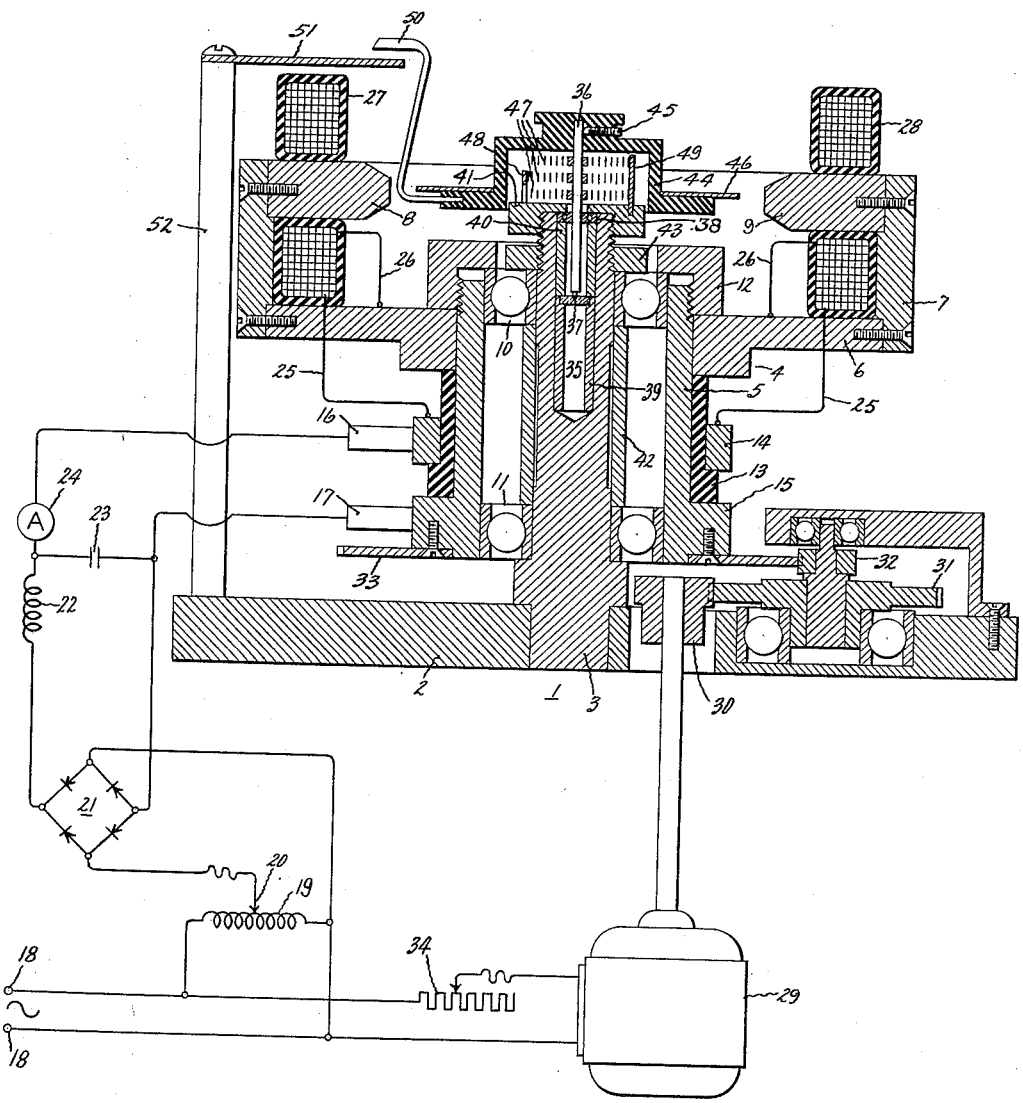
Inventor:
Elmer F. Hansen,
by Russell A. Warner
His Attorney.

Patented Jan. 9, 1951

2,537,753

UNITED STATES PATENT OFFICE 2,537,753

MAGNETIC TORQUE METER

Elmer F. Hansen, Marblehead, Mass., assignor to General Electric Company, a corporation of New York Application September 28, 1949, Serial No. 118,328

1 Claim. (Cl. 175—183)

This invention relates to a machine for the measurement of magnetic and electrical conducting properties of materials in terms of the amount of torque which a material sample will transmit when positioned in a moving magnetic field.

It is often desirable in the manufacture, preparation and heat treatment of sheet steel or other magnetic material for use in the manufacture of electromagnetic apparatus such as motors, generators and transformers to test the magnetic material for its magnetic properties in order to control the quality of the product closely and to assure that the apparatus will be efficient when constructed of the material tested. The two well-known types of energy losses in magnetic structures which cause a loss of efficiency are hysteresis and eddy current losses.

It is, therefore, an object of my invention to provide a machine which will quickly and easily measure the magnetic hysteresis and eddy current characteristics of a sample of magnetic material.

In carrying out my invention, therefore, I may employ a testing machine comprising rotating magnetic poles and a rotatable spring-restrained holder for positioning a sample of material to be tested within the magnetic field of the rotating magnetic poles, whereby the attraction of the sample to the rotating poles causes a rotational torque to be transmitted from the poles, through the sample to the sample holder to cause a rotational deflection of the sample holder against the force of the spring, the magnitude of the deflection being an indication of the magnetic and conductive properties of the sample.

For additional objects and advantages and for a better understanding of the invention, attention is now directed to the following description and the accompanying drawing and the novel features of the invention are set forth with particularity in the appended claim. In the drawing the device of this invention is shown partially in section with associated electrical power supply apparatus shown schematically.

Referring more particularly to the drawing, the machine of this invention is represented as a whole as 1, and includes a base member 2 on which is mounted a stationary spindle 3. A rotor 4, including a sleeve member 5, a flange member 6, a cylindrical member 7 and magnetic pole pieces 8 and 9, is rotatably mounted by means of ball bearings 10 and 11 on spindle 3. The weight of rotor 4 is carried as a thrust load on bearing 10 through an end cap 12 which is threaded onto the upper end of sleeve member 5. Surrounding sleeve member 5 below flange member 6 is an insulating sleeve 13 on which is mounted an insulated current collector ring 14. Ring 14 is press-fitted on sleeve 13. Insulating sleeve 13 is supported on a collector ring flange 15 at the bottom of sleeve member 5. Flang member 6 and insulating sleeve 13 are firmly held between end cap 12 and collector ring flange 15.

Insulated collector ring 14 and collector ring flange 15 serve as power input connections for rotor 4 through brushes 16 and 17 which respectively engage rings 14 and 15. Power is supplied to brushes 16 and 17 through a circuit which is shown schematically as having input terminals 18 from which an alternating current is obtained to energize a variable voltage adjusting device which may comprise an autotransformer 19 with a movable voltage adjusting contact 20 and a full wave rectifier 21 which may employ four dry type rectifying elements such as copper oxide rectifiers. A filter comprising an inductance 22 and a capacitance 23 may be employed to smooth out the direct current output of rectifier 21 and an ammeter 24 may be provided for measuring current input to the rotor. Rotor power is supplied through connections 25 from collector ring 14, and connections 26 from collector ring 15 and sleeve 5 through flange member 6, to excitation coils 27 and 28 on pole pieces 8 and 9. Pole pieces 8 and 9 thus provide a direct magnetic field of a strength which is adjustable by movement of variable voltage device 19 and measurable in terms of the current at ammeter 24.

Rotor 4 is rotated by an adjustable speed motor 29 through a pinion 30, gear 31, pinion 32 and gear 33 which is fastened to the bottom surface of collector ring flange 15 on sleeve member 5 of the rotor. Motor 29 is also supplied with power through terminals 18 and in series with a variable resistance 34 by which the speed of the motor may be varied.

The upper end of spindle 3 contains a hollow opening 35 within which a pin 36 is rotatably mounted on a ball type thrust bearing 37 and a small low friction bearing such as ball bearing 38. Bearings 37 and 38 are properly spaced and retained within opening 35 by hollow cylindrical spacing member 39 and 40 and a retainer end cap 41 which is threaded on the upper end of spindle 3.

Bearings 10 and 11 are also spaced and retained respectively by a spacer 42 and a threaded retainer 43.

On the pin 36 there is mounted a turntable 44 which is adjustably retained on the pin by a set screw 45. Turntable 44 supports the sample 46 of material which is to be tested. Pin 36, turntable 44 and sample 46 are biased to a rotational index position by spiral clock type springs 47 which are connected between spindle 36 and pins 48 and 49 in a suitable manner. Protruding from the periphery of turntable 44 is an indicator arm 50 which is of such shape as not to interfere with assembly and removal of test sample 46. The position of indicator arm 50 may be determined by reference to a scale plate 51 which is fixedly mounted to base 2 by means of supporting posts at 52.

The operation of my testing machine is as follows: Sample 46 is selected and placed on the turntable 44 and by means of set screw 45 turntable 44 may be positioned on pin 36 so that indicator arm 50 reads at a zero point on scale plate 51. The coils 27 and 28 are then energized by power from terminals 18 through the circuit described above including variable voltage device 19, rectifier 21 and brushes 16 and 17 to provide a magnetic field through poles 8 and 9 which traverses the test sample 46. The rotor 4 and poles 8 and 9 are then revolved by means of drive motor 29 at a desired speed determined by variable resistance 34. The attraction of the magnetic test sample 46 to the rotating field provided by poles 8 and 9 provides a torque on turntable 44 which causes a deflection of the turntable sufficient to stress the springs 47 to a point where the spring force will counteract the torque. The characteristic of the springs 47 is preferably linear so that the deflection of indicator arm 50, as indicated on scale plate 51, is directly proportional to the magnitude of the torque.

When rotor 4 is rotated at relatively low speeds in the order of thirty to one hundred eight revolutions per minute, a measurement of the hysteresis loss in the test sample 46 is obtained, since at these low speeds the eddy currents and the torque resulting therefrom are negligible. The rotor 4 may then be rotated at a relatively high speed in the order of thirty-six hundred revolutions per minute to measure the combined hysteresis and eddy current torque. The hyteresis effect continues at this high speed and the eddy current effect appears. By means of calibration curves, determined by testing samples of known characteristics, the hysteresis and eddy current producing properties of any sample may be first obtained in terms of degrees of deflection of indicator arm 50 and then converted to more conventional units such as energy loss. Scale plate 51 may, of course, be calibrated directly in terms of energy loss units. Tests at various magnetic flux densities may be made by control of the current in coils 27 and 29 by adjustment of variable voltage device 19. This machine may also be used to determine the conductive properties of nonmagnetic materials in terms of the amount of eddy current losses which may be measured by the eddy current torque as just described.

This machine is preferably constructed entirely of non-magnetic materials except for cylindrical member 7 and pole pieces 8 and 9. These materials may be any of those commonly known such as brass, bronze or aluminum. Turnable 44, however, is preferably comprised of a suitable insulating material, such as a resin bonded paper laminate, to avoid generation of eddy currents in this member and a resulting torque which would be erroneously attributed to the test sample. Pole pieces 8 and 9 and cylindrical member 7 are preferably of soft iron or other easily magnetizable material but may alternatively be of highly retentive permanent magnetic material, such as an aluminum-nickel-cobalt alloy. With such permanent magnets, magnetized to produce a field of desired strength, need for exciting coils 27 and 28 and the associated power supply circuit will be eliminated; but the flexibility of the equipment will be sacrified, since only one flux density can then be used. It will be seen that the cylindrical member 7, whether of soft iron or of a permanent magnetic material, provides a return path for the magnetic flux traversing the pole pieces 8 and 9. This cylindrical member also necessarily serves another important function, that is, it acts as a magnetic shield for the sample 46 against outside sources of magnetism.

The hub of turntable 44 may be decreased in size or eliminated by housing springs 47 below the turntable instead of within the hub. The center hole required in the test sample 46 may thereby be decreased or eliminated so that this machine may be adapted, if desired, for testing a disk-shaped sample. The turntaable may similarly be adapted for testing a standard rotor or stator punching for a dynamo-electric machine.

It will be seen from the above description that the machine of this invention provides a simple, flexible, reliable, economical means of testing the quality of magnetic sheet material for use in electrical apparatus.

While I have shown a particular embodiment of my invention, it will, of course, be understood that I do not wish to be limited thereto since different modifications may be made, and I contemplate by the appended claim to cover any such modifications as fall within the true spirit and scope of my invention.

What I claim as new and desire to secure by Letters Patent of the United States is:

A hysteresis and eddy current torque testing machine comprising a supporting base, a spindle extending upwardly perpendicular to said base, a rotor rotatably mounted by means of ball bearings on said spindle, said spindle including an axial opening at the upper end thereof, a turntable for supporting a test sample, including a central shaft and being mounted for rotation independently of said rotor by positioning of said central shaft with suitable bearings within said axial opening, a spiral spring connected between said turntable shaft and said spindle for biasing said turntable to a predetermined desired rotational index position, said rotor including a hollow cylindrical member of magnetic material extending upwardly to surround the test sample, two magnetic pole pieces in diametrically opposed positions on the inner surface of said cylindrical member extending radially inwardly therefrom and toward said turntable to provide a magnetic field in the sample to be tested, electrical windings positioned on each of said pole pieces, an electrical circuit for energizing said windings including a voltage varying device and a current measuring device, an electric drive motor, an energizing circuit for said drive motor including a second voltage varying device for adjusting the speed of said motor, speed reducing gears connected between said motor and said rotor for driving said rotor, said pole pieces when energized by said windings and rotated with said rotor being adapted to cause attraction of the test sample to thereby impart a rotational torque and deflection to said turntable the magnitude of which is a measure of hysteresis and eddy current effects in the sample, a stationary indicator plate mounted on said base, said turntable including a pointer for indicating the rotational deflection of said turntable on said indicator plate.

ELMER F. HANSEN.

REFERENCES CITED

The following references are of record in the file of this patent:

UNITED STATES PATENTS

| Number | Name | Date |
|---|---|---|
| 1,459,970 | Burrows | June 26, 1923 |
| 1,599,645 | Burrows | Sept. 14, 1926 |
| 2,182,859 | Wright | Dec. 12, 1939 |